Nov. 4, 1969  W. N. HANSEN ET AL  3,476,460

ELECTROCHEMICALLY CONTROLLED LIGHT REFLECTION

Filed June 30, 1966

INVENTOR.
WILFORD N. HANSEN
ROBERT A. OSTERYOUNG
BY

ATTORNEY

United States Patent Office 3,476,460
Patented Nov. 4, 1969

3,476,460
ELECTROCHEMICALLY CONTROLLED LIGHT REFLECTION
Wilford N. Hansen, Thousand Oaks, and Robert A. Osteryoung, Canoga Park, Calif., assignors to North American Rockwell Corporation, a corporation of Delaware
Filed June 30, 1966, Ser. No. 561,990
Int. Cl. G02f 1/28, 1/36
U.S. Cl. 350—160                 4 Claims

ABSTRACT OF THE DISCLOSURE

This disclosure relates to a method for controlling the reflectivity of a surface utilizing internal reflection techniques. An internal reflection member is used through which a beam of radiation is passed such that a single or a plurality of reflections take place at the electrically conducting interface between the member and a surrounding electrolytic solution. The reflecting properties of the interface are then modified by the application of a potential across the interface, the variations in the potential modulating the light reflected at the interface.

---

This invention is directed to the modulation of light and more particularly to the modulation of light using electrochemically controlled internal reflection.

The present invention is particularly adapted to modulate coherent light generated by lasers. It is well-known that one or more of the characteristics of coherent electromagnetic radiation may be modulated so that information may be transmitted. This modulation may be of the phase, frequency or amplitude type and various techniques and devices have been suggested. For example, prior art coherent light modulating arrangements may utilize polarizers, Kerr cells or mechanically adjustable Fabray-Perot reflectors. Other suggestions include utilizing the space-charge region of a p-n junction in a semiconductor as a window the width of which is modulated by an applied field. Such devices have been useful only with very narrow light beams, involve substantial losses of light, and required precision alignment of the beam and p-n junction, or impose severe limits because of phase interference. In general, the proposals of the prior art for modulating coherent light beams introduce difficulties in application, the most significant being the lack of discreteness of the modulating effect and the complexity of the auxiliary equipment needed to attain the desired modulation. Other proposals utilize reduction-oxidation reactions where a light absorbing species is plated onto or removed from a surface to control the transmission through the surface. Such arrangements, however, require a much larger amount of charge than the system of the present invention. Further, any variation in the uniformity of the deposited reflecting layer effects the transmission while in the system of the present invention only a monolayer deposit is required to obtain far superior results utilizing attenuated total reflection.

Therefore, it is an object of the present invention to modulate optical radiation without encountering the disadvantages of the prior art methods.

More specifically, it is the object of the present invention to provide a method for electrochemically controlling the reflectivity of an interface to modulate reflected light.

Another object of the present invention is to provide a method for electrochemically modulating light reflected from a attenuated total reflection surface.

It is another object of the present invention to provide a method particularly adapted for modulating coherent light generated by a laser.

Figure 1:
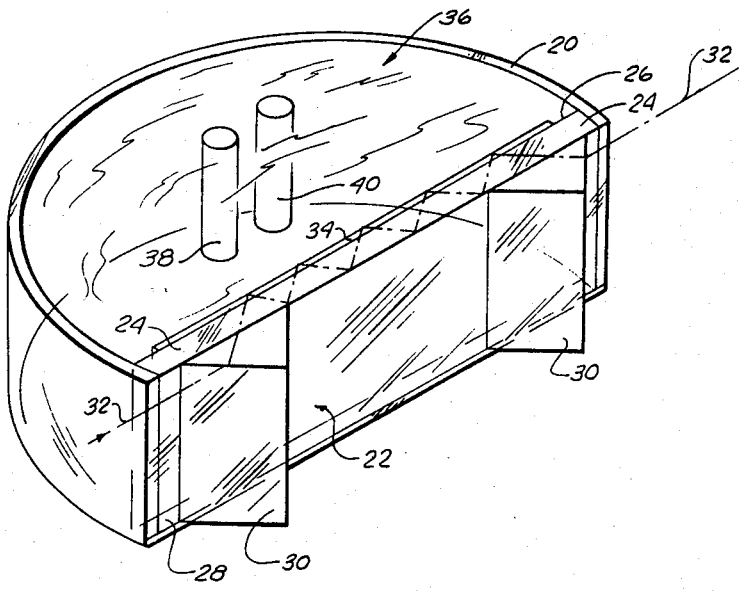
Figure 2:
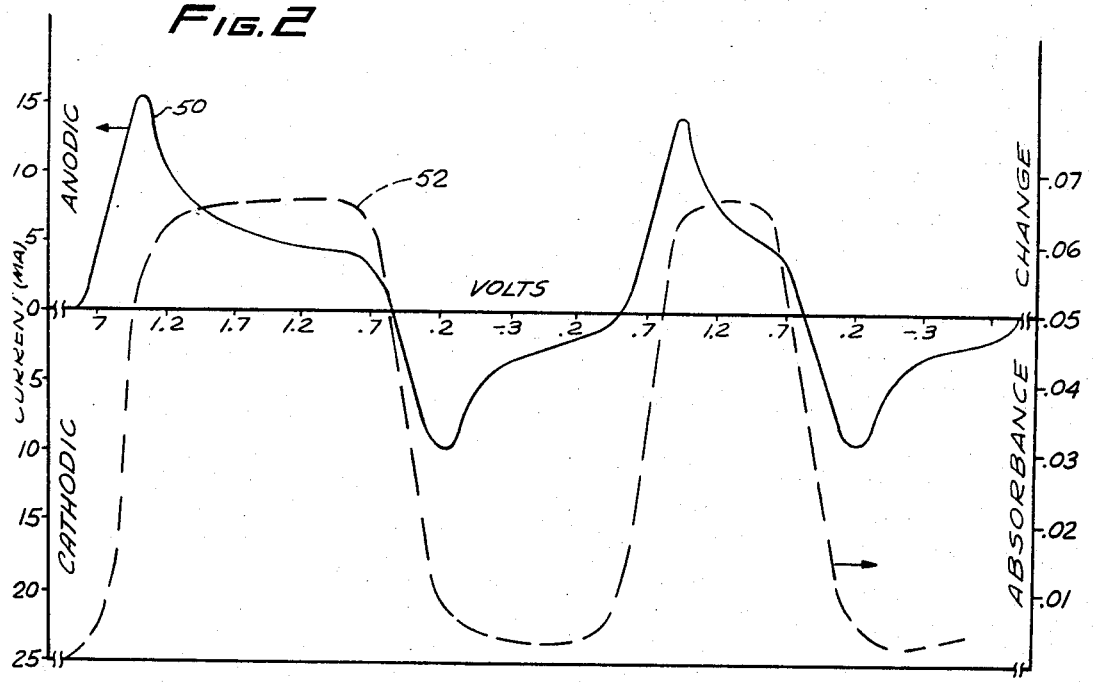

These and other objects of the present invention will be more apparent from the following detailed description and claims together with the accompanying drawings, made apart hereof, in which:

FIG. 1 is a schematic perspective view of an apparatus for carrying out the method of the present invention; and FIG. 2 is a graph illustrating the electrochemical control of light utilizing the method of the present invention.

Referring to the drawings in detail, a representative device for practicing the method of the invention is shown in FIG. 1. The device comprises a container 20 one end of which contains a standard attenuated total reflection device 22 appropriately sealed to the side and bottom walls of container 20. The reflection device 22 is preferably of the type disclosed in the copending application of Wilford N. Hansen, Ser. No. 301,829, filed Aug. 13, 1963, and the application of Wilford N. Hansen and James A. Horton, Ser. No. 397,195, filed Sept. 17, 1964, both having a common assignee herewith, the disclosures of which are incorporated herein by reference, but may be of any such type known in the art.

In the preferred arrangement shown in FIG. 1 the multiple reflection device used comprises a radiation transmitting plate member 24 having an inner surface 26 and an outer surface 28. On opposite ends of the outer surface 28 area pair of prisms 30 in optical contact with plate 24 and aligned and positioned so that a beam of radiation will be directed along the path illustrated at 32. The inner surface 26 is coated with a layer 34 of material which is both electrically conducting and radiation transmitting. The layer 34 is preferably a layer of modified tin oxide glass, although other conducting glasses, metals or other well-known conducting materials transparent to the desired radiation to be modulated may be used.

The interior of the container 20 is filled with an electrolyte 36 into which an auxiliary electrode 38 and reference electrode 40 are inserted. These two electrodes together with the conducting layer 34 and electrolyte 36 constitute the electrochemical cell.

In operation the light (visible, ultraviolet or infrared) passing along the path 32 is ordinarily totally reflected by the interface between the conducting layer 34 and the electrolyte 36. When a potential is applied beween electrodes 38 and 34 the interfacial region between the conducting layer or coating 34 and the electrolyte 36 is modified electrochemically so that the light absorbing characteristics are changed. In this manner the points of reflection of the path 32 at the interface are rapidly changed to points of absorption and a beam of light entering on path 32 will be significantly attenuated. This effect is reversible so a light beam may be selectively modulated by controlling or programming the potential applied between electrodes 38 and 34.

A variety of electrochemical processes may be utilized to control the light absorbing characteristics at the interface between the electrolyte and the conducting, transparent layer. For example, the following types may be used: (1) reduction-oxidation reactions involving at least one highly absorbing species in solution; (2) changing the absorptivity of a species adsorbed on the coated electrode surface by potential variation; (3) changing the surface states of the coating electrode; (4) changing of the ions in the double layer, i.e., non-Faradaic processes; and (5) changing absorptivity of a species in the vicinity of the interface by potential change.

Utilizing the above-described apparatus the following examples illustrated the method of the present invention.

EXAMPLE I

Methylene blue in water soluble form, i.e., as a salt, was added to water. The concentration was such that about three centimeters of solution was opaque to ordinary room light. Methylene blue readily adsorbs on the tin oxide coated glass used as electrode 34 and the spectrum of the adsorbed material was readily seen.

A potential was applied between the electrodes 34 and 38 of various amounts up to three volts. At the same time the absorbance of the multiple internal reflection cell was monitored with a spectrophotometer. Large changes in absorbance were observed, i.e., a change in light energy transmitted of as much as 20 percent per reflection was obtained. The changes in absorbance were so rapid as the potential was changed that the pen response time (0.5 second) was the limiting factor.

In addition to using an electrode 34 of tin oxide on glass, thin metal films were used. For example, gold, platinum and palladium films gave similar effects with methylene blue. However, their adherence to the glass was affected by the aqueous solution.

EXAMPLE II

Ferroin was substituted for the methylene blue of Example I. Comparable modulation effects were observed but the optimum wavelength region was shifted.

EXAMPLE III

Iodide-iodine solutions were substituted for the methylene blue of Example I. The modulation effects were observed but had a decreased intensity.

EXAMPLE IV

A slightly acid solution, e.g., nothing present in the water except enough $H_2SO_4$ to give a pH of 2, was used.

The potential of the tin oxide electrode 34 was varied and the absorbance recorded, where the absorbance $A = N \log 1/R$, R being the reflectivity for a single reflection and N the number of reflections at the solution electrode interface. When the potential of electrode 34 was made negative enough to be in the range where hydrogen evolution could be expected, the absorbance increased rapidly and became as large as a change in absorbance of two for five interface reflections. The more negative the voltage the faster and larger the effect. This effect also occurred when other reagents were present in the solution provided the potential was sufficiently negative. The low absorbance could be restored again by making the potential of electrode 34 positive so that the point where oxygen would be evolved was closely approached. Only partial restoration of the low absorbance was observed if a less positive potential was used.

FIG. 2 is a graph illustrating the electrochemical control of light reflection utilizing the device of FIG. 1. In FIG. 2 curve 50 is a current vs. voltage curve obtained with a linear potential sweep of 0.1 v./sec. applied at the conducting glass electrode 34. The voltage is applied between electrodes 34 and 38 and measured between the saturated calomel electrode 40 and the glass electrode 34. When the current is anodic, increasing voltage ramp as shown in the abscissa of FIG. 2, the organic material is being oxidized to form a colored highly absorbing entity at the interface. This is shown by the large increase in absorbance, curve 52, during the first part of the increasing-voltage ramp. The current, curve 50, is diffusion limited and therefore decreases after reaching a peak at about 1 volt. The absorbance remains approximately the same until the decreasing applied ramp voltage reaches about 1 volt at which time both the current, curve 50, and the absorbance decrease rapidly. When the current is cathodic, the oxidation product is being reduced, i.e., removed from the interface, and the light absorbance is decreased to a background value. Since the sweep is linear with time and direction the voltage ramp is reversed periodically.

Curve 52 illustrates the modulation control that can be obtained and indicates that the periodicity and duration of a preselected absorbance level may be changed by changing the applied voltage either manually or in an automatic programmed manner so that the modulation of the reflected light is closely controlled.

Although particular embodiments of the present invention have been described, various modifications will be apparent to those skilled in the art without departing from the scope of the invention. Therefore, the present invention is not limited to the specific embodiments disclosed but only by the appended claims.

We claim:

1. A method of controlling the reflectivity of a surface comprising the steps of forming an attenuated total reflecting interface, electrochemically modifying the light absorbing characteristics of said interface, reflecting light from said interface a plurality of times, and controlling said electrochemical modification to selectively modulate the light reflected by said interface.

2. The method of claim 1 wherein said modifying step includes the step of applying a potential across said interface and said controlling step includes selectively changing said potential to modify the reflecting characteristics of said interface.

3. The method of claim 1 wherein said modifying step includes the step of applying a potential between a conducting medium and an electrolyte and said controlling step includes the step of changing said potential in a predetermined manner to modulate the light reflected from said modified interface.

4. The method of claim 1 wherein said step of forming an attenuated total reflecting interface includes the step of forming a transparent conducting medium on a surface and contacting said surface with an electrolyte.

References Cited

UNITED STATES PATENTS

| | | | |
|---|---|---|---|
| 2,185,379 | 1/1940 | Myers et al. | 178—7.7 X |
| 3,153,113 | 10/1964 | Flanagan et al. | 88—61 |
| 3,307,897 | 3/1967 | Lohmann | 350—160 |

OTHER REFERENCES

Hansen et al.: "Spectrometer Cells for Single and Multiple Internal Reflection Studies in UV, Visible, Near IR, and IR Spectral Regions," Analytical Chemistry, vol. 36, No. 4, April 1964, pp. 783–787.

RONALD L. WIBERT, Primary Examiner
PAUL K. GODWIN, Assistant Examiner

U.S. Cl. X.R.
350—290, 299